(12) United States Patent
Takeda et al.

(10) Patent No.: US 8,787,281 B2
(45) Date of Patent: Jul. 22, 2014

(54) BASE STATION APPARATUS AND USER TERMINAL

(75) Inventors: Kazuaki Takeda, Tokyo (JP); Nobuhiko Miki, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 5 days.

(21) Appl. No.: 13/261,493

(22) PCT Filed: Apr. 21, 2011

(86) PCT No.: PCT/JP2011/059850
§ 371 (c)(1),
(2), (4) Date: Nov. 20, 2012

(87) PCT Pub. No.: WO2011/136126
PCT Pub. Date: Nov. 3, 2011

(65) Prior Publication Data
US 2013/0058286 A1 Mar. 7, 2013

(30) Foreign Application Priority Data

Apr. 30, 2010 (JP) ................................. 2010-105948

(51) Int. Cl.
*H04W 28/04* (2009.01)
*H04L 5/00* (2006.01)
*H04W 72/04* (2009.01)
*H04W 88/02* (2009.01)
*H04W 88/08* (2009.01)

(52) U.S. Cl.
CPC ............... *H04W 28/04* (2013.01); *H04L 5/001* (2013.01); *H04W 72/04* (2013.01); *H04W 72/042* (2013.01); *H04W 88/08* (2013.01)
USPC ........................................................ 370/329

(58) Field of Classification Search
CPC ..... H04W 28/04; H04W 72/04; H04W 88/08; H04L 5/001
See application file for complete search history.

(56) References Cited

U.S. PATENT DOCUMENTS 8,483,172 B1 * 7/2013 Dinan ........................... 370/330
2008/0019307 A1 * 1/2008 Tenny et al. .................. 370/329

(Continued)

FOREIGN PATENT DOCUMENTS

WO     2010/050234 A1     5/2010

OTHER PUBLICATIONS

Panasonic, titled "PDCCH with cross carrier operation," (Panasonic hereinafter) was presented in 3GPP TSG-RAN WG1 Meeting #60 as document R1-101249 in San Francisco, USA, Jan. 22-26, 2010, Agenda Item: 7.1.3 ,pp. 1-5.*

(Continued)

*Primary Examiner* — Andrew Lai
*Assistant Examiner* — Hoyet H Andrews
(74) *Attorney, Agent, or Firm* — Osha Liang LLP

(57) ABSTRACT

A base station apparatus having a control information generation section that generates, per fundamental frequency block, a downlink control information piece for demodulating a data channel that is transmitted for each of a plurality of fundamental frequency blocks assigned to a user terminal, a determining section that determines, per fundamental frequency block, a search space which is a candidate area where the downlink control information piece is arranged, and a transmission section that transmits a downlink control channel in which the search space containing the downlink control information piece is arranged is disclosed. The control information generation section arranges respective downlink control information pieces corresponding to the fundamental frequency blocks in a downlink control channel of a specific fundamental frequency block among the fundamental frequency blocks, and the determining section distributes positions of search spaces such that the search spaces are separate between fundamental frequency blocks and between user terminals.

14 Claims, 10 Drawing Sheets

(56) References Cited

U.S. PATENT DOCUMENTS

| | | | |
|---|---|---|---|
| 2010/0279628 A1* | 11/2010 | Love et al. ............. | 455/70 |
| 2011/0110315 A1* | 5/2011 | Chen et al. ............. | 370/329 |
| 2011/0194525 A1* | 8/2011 | Nishio et al. ........... | 370/329 |
| 2011/0205978 A1* | 8/2011 | Nory et al. ............. | 370/329 |
| 2011/0228724 A1* | 9/2011 | Gaal et al. ............. | 370/328 |
| 2012/0009959 A1* | 1/2012 | Yamada et al. .......... | 455/507 |
| 2012/0093097 A1* | 4/2012 | Che et al. .............. | 370/329 |
| 2012/0122472 A1* | 5/2012 | Krishnamurthy et al. . | 455/456.1 |
| 2013/0039295 A1* | 2/2013 | Chou ................... | 370/329 |
| 2013/0044711 A1* | 2/2013 | Aiba et al. ............. | 370/329 |
| 2013/0083740 A1* | 4/2013 | Eriksson et al. ......... | 370/329 |
| 2013/0088973 A1* | 4/2013 | Yang et al. ............. | 370/241 |
| 2013/0142141 A1* | 6/2013 | Dinan .................. | 370/329 |
| 2013/0182692 A1* | 7/2013 | Dai et al. .............. | 370/336 |
| 2013/0188589 A1* | 7/2013 | Nakashima et al. ...... | 370/329 |
| 2013/0188592 A1* | 7/2013 | Yang et al. ............. | 370/329 |
| 2013/0195057 A1* | 8/2013 | Dinan .................. | 370/329 |
| 2013/0195063 A1* | 8/2013 | Ahn et al. .............. | 370/329 |

OTHER PUBLICATIONS

CMCC, Huawei, ZTE et al., titled "Decreasing block probability for cross carrier PDCCH," (CMCC hereinafter) was presented in 3GPP TSG-RAN WG1 Meeting #60 as document R1-101390 in San Francisco, USA, Feb. 22-26, 2010, Agenda Item: 7.1.3 ,pp. 1-3.*

LG Electronics, titled "Discussion on Resource Allocation for MU-MIMO," (LG hereinafter) was presented in 3GPP TSG-RAN WG1 Meeting #60 as document R1-101238 in San Francisco, USA, Feb. 22-26, 2010, Agenda Item: 7.2.3.2, pp. 01-02.*

Titled "3rd Generation Partnership Project_Technical Specification Group Radio Access Network_Evolved Universal Terrestrial Radio Access (E-UTRA)_Multiplexing and channel coding (Release 9)," was presented as Technical Specification, 3GPP TS 36.212 V9.1.0 (Mar. 2010), pp. 01-61.*

Titled "3rd Generation Partnership Project_Technical Specification Group Radio Access Network_Further Advancements for E-UTRA Physical Layer Aspects (Release 9)," was presented as Technical Specification, 3GPP TR 36.814 V2.0.0(Mar. 2010), pp. 01-103.*

"3rd Generation Partnership Project Technical Specification Group Radio Access Network Evolved Universal Terrestrial Radio Access (E-UTRA)_Physical layer procedures (Release 9)," was presented as Technical Specification, 3GPP TS 36.213 V9.1.0 (Mar. 2010), pp. 01-79.*

Guangxiang Yuan; Xiang Zhang; Wenbo Wang; Yang Yang, "Carrier aggregation for LTE-advanced mobile communication systems," Communications Magazine, IEEE , vol. 48, No. 2, pp. 88,93, Feb. 2010, doi: 10.1109/MCOM.2010.5402669.*

3GPP1 et al., titled "3rd Generation Partnership Project Technical Specification Group Radio Access Network Evolved Universal Terrestrial Radio Access (E-UTRA)_Multiplexing and channel coding (Release 9)," (3GPP1 hereinafter) was presented as Technical Specification, 3GPP TS 36.212 V9.1.0 (Mar. 2010), pp. 01-61.*

3GPP2 et al., titled "3rd Generation Partnership Project Technical Specification Group Radio Access Network Further Advancements for E-UTRA Physical Layer Aspects (Release 9)," (3GPP2 hereinafter) was presented as Technical Specification, 3GPP TR 36.814 V2.0.0 (Mar. 2010), pp. 01-103.*

CMCC, Huawei, Zte et al., titled "Decreasing block probability for cross carrier PDCCH," (CMCC hereinafter) was presented in 3GPP TSG-RAN WG1 Meeting #60 as document R1-101390 in San Francisco, USA, Feb. 22-26, 2010, Agenda Item: 7.1.3 ,pp. 01-03.*

CMCC, et al., "Decreasing block probability for cross carrier PDCCH," 3GPP TSG RAN WG1 #60; R1-101390; San Francisco, USA; Feb. 22-26, 2010 (3 pages).

Huawei, "Carrier segments," 3GPP TSG RAN WG1 Meeting #59bis; R1-100238; Valencia, Spain; Jan. 18-22, 2010 (6 pages).

3GPP TS 36.211 V8.4.0, "3rd Generation Partnership Project; Technical Specification Group Radio Access Network; Evolved Universal Terrestrial Radio Access (E-UTRA); Physical Channels and Modulation (Release 8)," Sep. 2008 (78 pages).

3GPP TS 36.212 V8.4.0, "3rd Generation Partnership Project; Technical Specification Group Radio Access Network; Evolved Universal Terrestrial Radio Access (E-UTRA); Multiplexing and channel coding (Release 8)," Sep. 2008 (56 pages).

3GPP TS 36.213 V8.4.0, "3rd Generation Partnership Project; Technical Specification Group Radio Access Network; Evolved Universal Terrestrial Radio Access (E-UTRA); Physical layer procedures (Release 8)," Sep. 2008 (60 pages).

International Search Report issued in PCT/JP2011/059850, mailed on May 31, 2011 (1 page).

* cited by examiner

FIG. 4

BASE STATION APPARATUS AND USER TERMINAL

TECHNICAL FIELD

The present invention relates to a radio communication system that communicates by allocating a plurality of fundamental frequency blocks (hereinafter referred to as "component carriers") dynamically or semi-statically. More particularly, the present invention relates to a base station apparatus and a user terminal that transmit and receive downlink control channels under carrier aggregation.

BACKGROUND ART

The communication scheme to be a successor of W-CDMA (Wideband Code Division Multiple Access) and HSDPA (High Speed Downlink Packet Access), that is, long-term evolution (LTE), has been set forth by 3GPP, which is the standards organization of W-CDMA, and, for radio access schemes, OFDMA (Orthogonal Frequency Division Multiple Access) has been employed on the downlink and SC-FDMA (Single-Carrier Frequency Division Multiple Access) has been employed on the uplink. Presently, 3GPP is studying the successor system of LTE (referred to as "LTE-Advanced" including Release 10 and including versions after Release 10). LTE-Advanced hereinafter will be abbreviated as "LTE-A".

The LTE system is a system to perform communication by sharing one or more than one physical channels by a plurality of mobile stations UEs, on both the uplink and the downlink. A channel that is shared by a plurality of mobile stations UEs is generally referred to as a shared channel (or may also be referred to as "data channel"), and, in LTE, is the PUSCH (Physical Uplink Shared Channel) on the uplink or the PDSCH (Physical Downlink Shared Channel) on the downlink.

In a communication system using shared channels such as the LTE system, to which mobile stations UEs the above shared channels are allocated needs to be signaled per transmission time interval (TTI) (or per subframe in LTE). The PDCCH (Physical Downlink Control Channel) is defined as the downlink control channel to be used for the above signaling. A mobile station UE receives the PDCCH and performs blind decoding, thereby extracting downlink control information for that mobile station UE. In LTE, the search space, which defines the resource range where a mobile station has to perform blind decoding, is defined in order to reduce the load of the mobile station. The base station signals downlink control information for the mobile station by arranging the downlink control information in the search space. The mobile station UE does not subject the whole range of the PDCCH to blind decoding, and performs blind decoding only on the search space in the PDCCH, and acquires the downlink control information for the subject station.

Citation List

Non Patent Literature

NPL 1: 3GPP, TS36.211 (V.8.4.0), "Evolved Universal Terrestrial Radio Access (E-UTRA); Physical Channels and Modulation (Release 8)", September 2008
NPL 2: 3GPP, TS36.212 (V.8.4.0), "Evolved Universal Terrestrial Radio Access (E-UTRA); Multiplexing and channel coding (Release 8)", September 2008
NPL 3: 3GPP, TS36.213 (V.8.4.0), "Evolved Universal Terrestrial Radio Access (E-UTRA); Physical layer procedures (Release 8)", September 2008

SUMMARY OF INVENTION

Technical Problem

Now, in LTE-A, which is presently under study by 3GPP, there is an agreement to widen the band by gathering and grouping a plurality of component carriers (carrier aggregation).

It is therefore an object of the present invention to provide a base station apparatus and a user terminal that can realize a search space configuration that is suitable to transmit and receive a downlink control channel in a communication system in which a plurality of component carriers are aggregated into a wide band.

Solution to Problem

A base station apparatus according to the present invention has a control information generation section configured to generate, per fundamental frequency block, a downlink control information piece for demodulating a data channel that is transmitted for each of a plurality of fundamental frequency blocks assigned to a user terminal, a determining section configured to determine, per fundamental frequency block, a search space which is a candidate area where the downlink control information piece is arranged, and a transmission section configured to transmit a downlink control channel in which search space containing the downlink control information piece is arranged, and, in this base station apparatus, the control information generation section arranges respective downlink control information pieces corresponding to the fundamental frequency blocks in a downlink control channel of a specific fundamental frequency block among the fundamental frequency blocks, and using at least a fundamental frequency block-specific offset value between the fundamental frequency block-specific offset value and a user terminal-specific offset value, the determining section distributes positions of search spaces such that the search spaces are separate between fundamental frequency blocks and between user terminals.

Advantageous Effects of Invention

According to the present invention, it is possible to provide a search space configuration that is suitable for a communication system in which a plurality of component carriers are aggregated into a wide band.

BRIEF DESCRIPTION OF DRAWINGS

FIG. 4 provides diagrams showing examples of arrangement of search spaces of a plurality of user terminals with respect to a system band formed with a plurality of component carriers;

DESCRIPTION OF EMBODIMENTS

In the communication system to which the present invention is applied, carrier aggregation to form a system band by adding or removing a plurality of component carriers is performed. Carrier aggregation will be described with reference to FIG. 1.

Figure 1:
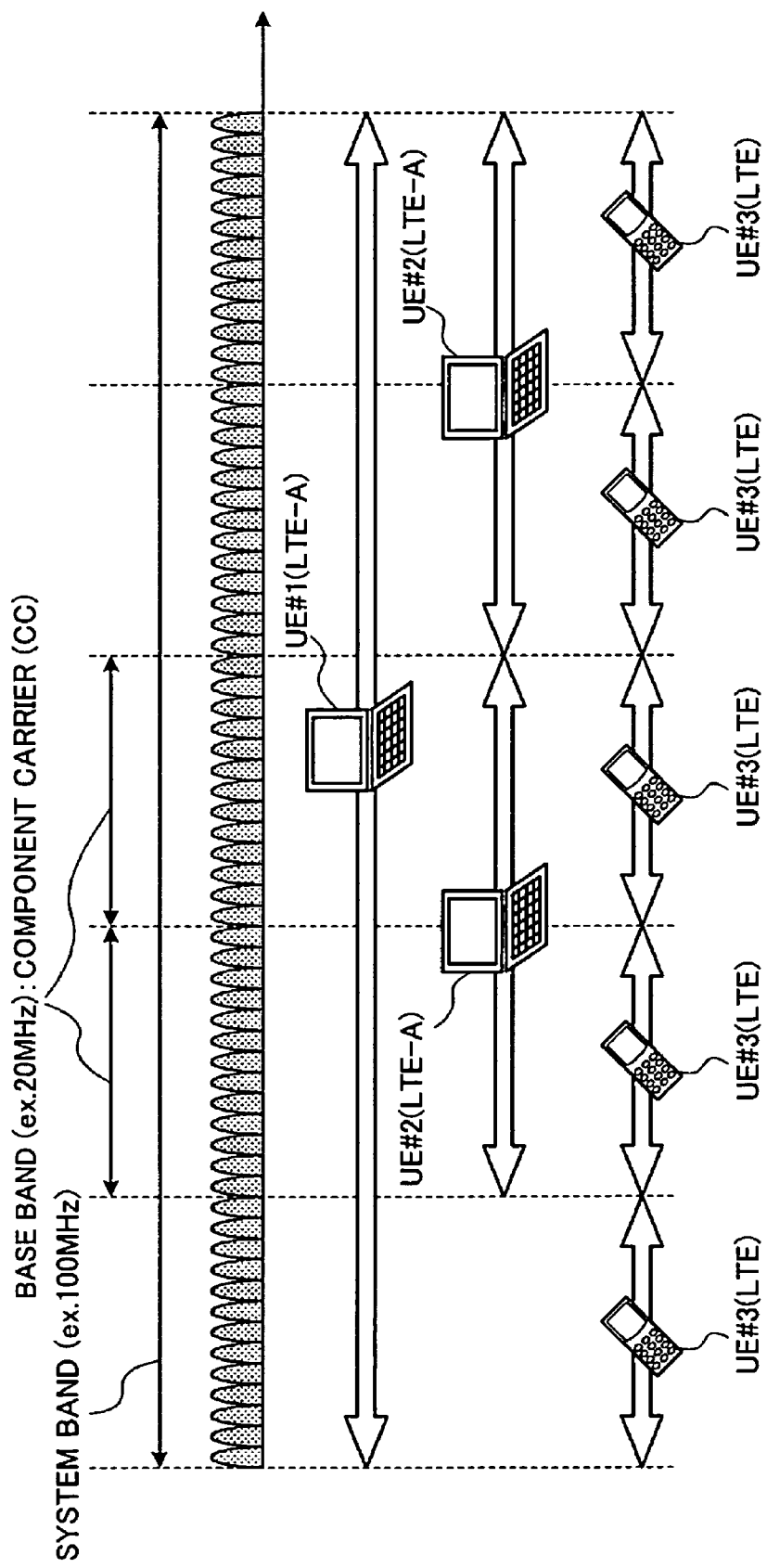
FIG. 1 is a diagram showing a layered bandwidth configuration defined in LTE-A.

FIG. 1 is a diagram showing a layered bandwidth configuration that is agreed in LTE-A. The example shown in FIG. 1 is a layered bandwidth configuration where the LTE-A system, which is the first mobile communication system to have the first system band formed with a plurality of component carriers (CCs), and the LTE system, which is a second mobile communication system to have a second system band formed with one component carrier, coexist. In the LTE-A system, radio communication is performed using, for example, a variable system bandwidth of maximum 100 MHz, and, in the LTE system, radio communication is performed using a variable system bandwidth of maximum 20 MHz. The system band of the LTE-A system includes at least one component carrier, where the system band of the LTE system is one unit, and increases or decreases the number of component carriers dynamically or semi-statically. Aggregating a plurality of component carriers into a wide band in this way is referred to as "carrier aggregation."

Figure 2:
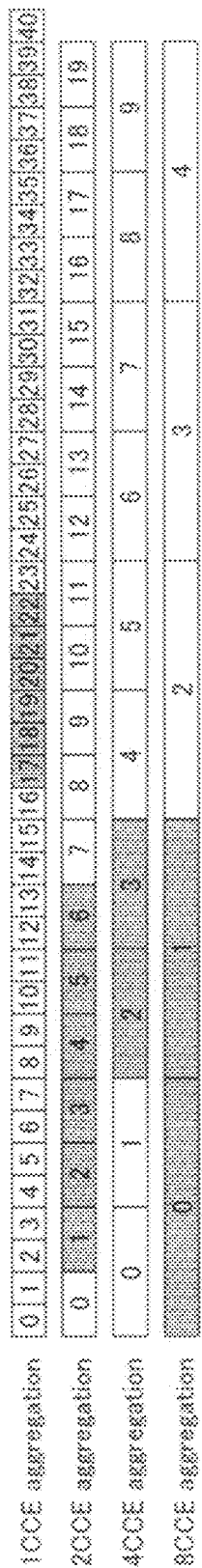
FIG. 2 is a diagram showing an example of arrangement of search spaces in the PDCCH when the number of carrier aggregations=1 component carrier.

For example, in FIG. 1, the system band of the LTE-A system is a system band to include bands of five component carriers (20 MHz×5=100 MHz), where the system band of the LTE system (base band: 20 MHz) is one component carrier. In FIG. 1, a mobile station UE (User Equipment) #1 is a user terminal to support the LTE-A system (and also support the LTE system), and is able to support a system band up to 100 MHz. UE #2 is a user terminal to support the LTE-A system (and also support the LTE system), and is able to support a system band up to 40 MHz (20 MHz×2=40 MHz). UE #3 is a user terminal to support the LTE system (and not support the LTE-A system), and is able to support a system band up to 20 MHz (base band). Next, a plurality of search space arrangements on the PDCCH of one component carrier will be described. FIG. 2 shows an example of arrangement of a search space in the PDCCH when the number of carrier aggregations=1 component carrier.

In LTE, rate matching of downlink control information (DCI) to one of 72, 144, 288 and 576 bits (where the cases of 72 bits and 576 bits correspond to the coding rates of 2/3 and 1/12) is performed according to the reception quality of a user terminal. 72 bits are defined as the basic unit for rate matching of downlink control information (CCE: Control Channel Element), and an optimal number of CCEs is determined according to reception quality, from four CCE aggregation levels (number of CCEs)={1, 2, 4, 8}. The CCE aggregation level is smaller for a user terminal of better reception quality, and the CCE aggregation level is made bigger for a user terminal of poorer reception quality such as a user terminal located at a cell edge. In this way, the CCE aggregation level for transmitting downlink control information (DCI) is determined per user terminal.

FIG. 2 shows an example of forming a component carrier's PDCCH with 41 CCEs. When the CCE aggregation level=1, a search space SS is arranged in 6 CCEs (the range of CCE numbers 17 to 22), and, when the CCE aggregation level=2, a search space SS is arranged in 6 CCEs (the range of CCE numbers 1 to 6). When the CCE aggregation level=4, a search space SS is arranged in 2 CCEs (the range of CCE numbers 2 and 3), and, when the CCE aggregation level=8, a search space SS is arranged in 2 CCEs (the range of CCE numbers 0 and 1).

The starting position of a search space is defined by the following equation 9 in Rel-8 LTE:

[Formula 1]

$$S_k^{(L)} = L\{(Y_k+m) \bmod \lfloor N_{CCE,k}/L \rfloor\} + i \quad \text{(Equation 9)}$$

where $Y_k=(A \cdot Y_{k-1}) \bmod D$;

L: the aggregation level, which shows the number of control channel elements;

i=0, ..., L−1;

m=0, ... $M^{(L)}$−1;

$M^{(L)}$: the number of downlink control channel candidates at aggregation level L;

$N_{CCE,k}$: the total number of control channel elements (CCEs) in subframe k in a fundamental frequency block;

$Y_{-1}=n_{RNTI}\neq 0$;

A=39828; and

D=65537.

Figure 3:
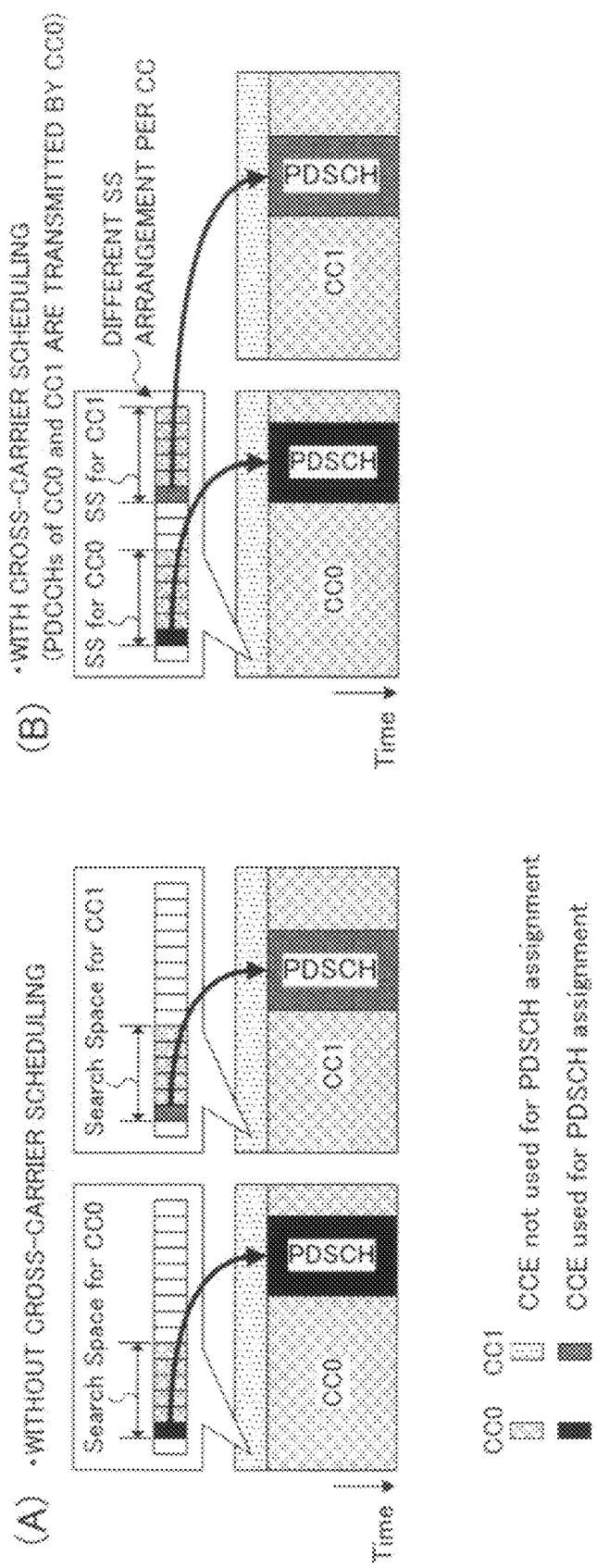
FIG. 3 provides diagrams showing examples of arrangement of search spaces related to a system band formed with a plurality of component carriers.

Now, for the method of transmitting a PDCCH that is necessary to receive a PDSCH in radio communication in a widened system band of the LTE-A system, the two methods shown in FIGS. 3(A) and 3(B) are possible.

According to the method illustrated in FIG. 3(A), the PDCCHs of PDSCHs assigned to a plurality of (here, two) different component carriers (CC #1 and CC #2) are transmitted by the component carriers to which the PDSCHs are assigned. To be more specific, the PDCCH to provide control information of the PDSCH assigned to component carrier CC #1 is transmitted by the same component carrier CC #1, and the PDCCH to provide control information of the PDSCH assigned to component carrier CC #2 is transmitted by the same component carrier CC #2. A user terminal decodes the PDCCHs transmitted by the respective component carriers, acquires the control information of the PDSCHs, and decodes the PDSCHs based on the control information.

With the method shown in FIG. 3B, the PDCCHs of PDSCHs assigned separately to a plurality of (here, two) different component carrier (CC #1 and CC #2) are transmitted in the control channel of one component carrier (CC #1) (cross-carrier scheduling). To be more specific, PDSCHs are separately assigned to component carriers CC #1 and CC #2, and the PDCCHs to provide control information related to these PDSCHs are transmitted by component carrier CC #1. In this way, by grouping PDCCHs in one component carrier, for example, it is possible to transmit PDCCHs using component carriers of good communication conditions.

However, when communication is performed in the above method shown in FIG. 3B (cross-carrier scheduling), if the starting positions of the search spaces corresponding to the PDCCHs contained in a specific component carrier are determined using the above equation 9, a problem arises that the search spaces for the different component carriers overlap completely. This is because a plurality of component carriers are not taken into account in the above equation 9.

So, when communication is performed by cross-carrier scheduling, a method of adding component carrier-specific offset values to the above equation 9 and distributing search spaces between component carriers for the same user, is possible. By this means, even when PDCCHs, which are control information related to PDSCHs assigned to a plurality of different component carriers, are transmitted in one component carrier, it is possible to prevent the search spaces associated with the PDCCHs from overlapping each other completely.

Figure 4:
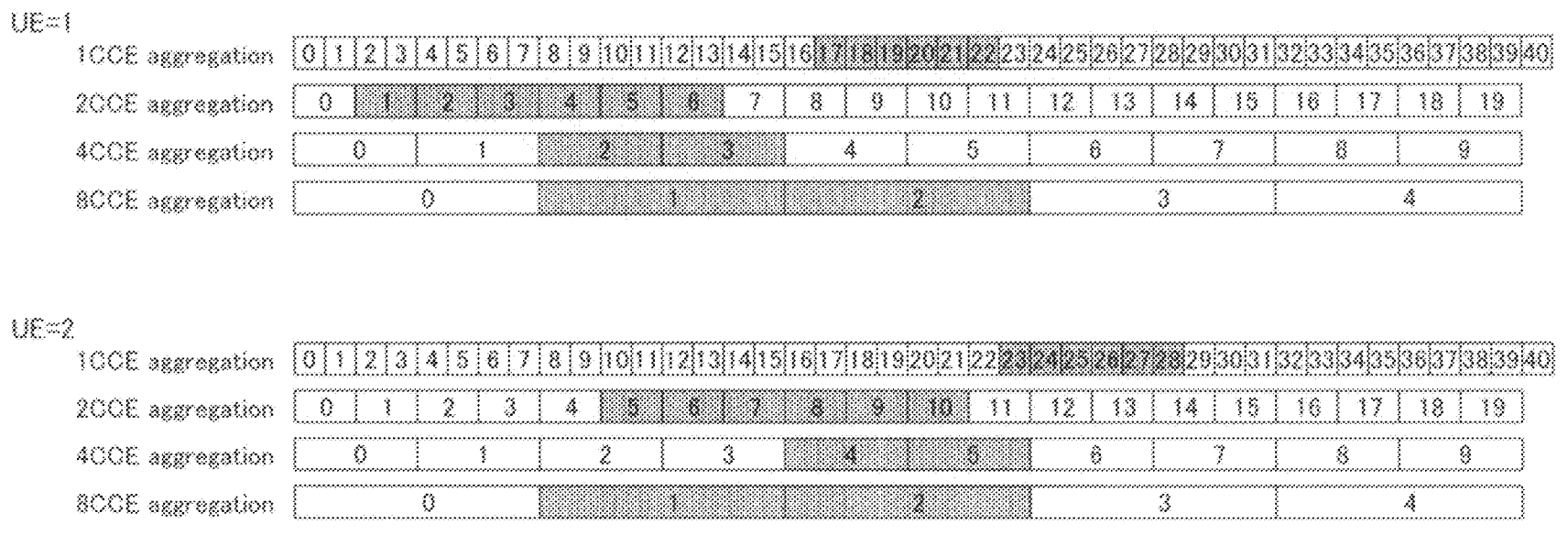

However, the present inventors have further studied the arrangement of search spaces and found out that, when communication is performed by cross-carrier scheduling by assigning the downlink and uplink system bands to be used in radio communication, to a plurality of user terminals, in fundamental frequency block units, if component carrier-specific offset values are simply added to the above equation 9, there is a possibility that search spaces overlap between user terminals. For example, considering search spaces for a plurality of (here, two) user terminals in a given component carrier (for example, CC #1), when the CCE aggregation level is 4 or 8, the number of CCEs to be candidates is small, and therefore the possibility that the search spaces overlap completely between different user terminals increases. As shown in FIG. 4, when search spaces for two users in CC #1 are given, at the CCE aggregation level=8, the search spaces overlap completely between the two users. In this way, when search spaces overlap completely between different user terminals, search spaces overlap with respect to all the rest of component carriers as well.

The present inventors have studied a search space arrangement, whereby, when the PDCCHs of PDSCHs assigned to a plurality of different component carriers are transmitted in the control channel of one specific component carrier, it is possible to prevent the search spaces of different component carriers from overlapping completely in the control channel of the specific component carrier, and, in addition, it is possible to prevent the search spaces from overlapping between different user terminals, and, as a result of this, have arrived at the present invention. To be more specific, in the search space arrangement of cross-carrier scheduling, by using user terminal-specific offset values in addition to component carrier-specific offset values, the starting positions are controlled such that the search spaces are separate from each other between a plurality of fundamental frequency blocks and between a plurality of user terminals. By this means, even when the PDCCHs of a plurality of different component carriers are transmitted by one component carrier, it is still possible to prevent the search spaces of different component carriers from overlapping completely and also prevent search spaces from overlapping completely between different user terminals. Now, a specific example of control of the starting positions of search spaces in cross-carrier scheduling will be described.

According to one aspect of the present invention, it is possible to determine the starting positions of search spaces in cross-carrier scheduling using the equation 1 below.

[Formula 2]

$$S_k^{(L)} = L\{(Y_k + m + f(n_{CC}, n_{RNTI})) \bmod \lfloor N_{CCE,k}/L \rfloor\} + i \quad \text{(Equation 1)}$$

where $Y_k = (A \cdot Y_{k-1}) \bmod D$;

$f(n_{CC}, n_{RNTI})$: an offset value that is calculated using a fundamental frequency block-specific index value $n_{CC}$ and a user terminal-specific index value $n_{RNTI}$;

L: the aggregation level to show the number of control channel elements, where a control channel element is the basic unit upon rate matching of downlink control information and is the minimum unit to form a search space;

i=0, ..., L−1, m=0, ... $M^{(L)}$−1;

$M^{(L)}$: the number of downlink control channel candidates at an aggregation level;

$N_{CCE,k}$: the total number of control channel elements (CCEs) in subframe k in a fundamental frequency block;

$Y_{-1} = n_{RNTI} \neq 0$;

A: constant; and

D: constant.

Note that, in LTE, A=39828 and D=65537.

In the above equation 1, the user terminal-specific index value $n_{RNTI}$ varies between different user terminals, and the component carrier-specific index value $n_{CC}$ varies between a plurality of component carriers. In this way, by controlling the arrangement of search spaces using an offset value calculated with the user terminal-specific index value $n_{RNTI}$ in addition to the component carrier-specific index value $n_{CC}$, even when the PDCCHs of a plurality of component carriers are grouped in a control channel of a specific component carrier, it is possible to distribute the search spaces between different component carriers for the same user terminal and also distribute the search spaces between different user terminals. As a result of this, even when the CCE aggregation level=4 or 8 upon cross-carrier scheduling, it is possible to effectively reduce the possibility that search spaces overlap completely between different component carriers and between different user terminals.

Also, according to another aspect of the present invention, the starting position of a search space in cross-carrier scheduling can be determined using the following equation 2:

[Formula 3]

$$S_k^{(L)} = L\{(Y_k + m) \bmod \lfloor N_{CCE,k}/L \rfloor\} + i \quad \text{(Equation 2)}$$

where $Y_k = (A(Y_{k-1} + f(n_{CC}, n_{RNTI}))) \bmod D$;

$f(n_{CC}, n_{RNTI})$: an offset value that is calculated using a fundamental frequency block-specific index value $n_{CC}$ and a user terminal-specific index value $n_{RNTI}$;

L: the aggregation level to show the number of control channel elements, where a control channel element is the basic unit upon rate matching of downlink control information and is the minimum unit to form a search space;

i=0, ..., L−1, m=0, ... $M^{(L)}$−1;

$M^{(L)}$: the number of downlink control channel candidates at an aggregation level;

$N_{CCE,k}$: the total number of control channel elements (CCEs) in subframe k in a fundamental frequency block;

$Y_{-1} = n_{RNTI} \neq 0$;

A: constant; and

D: constant.

Note that, in LTE, A=39828 and D=65537.

By applying the equation 2, it is possible to prevent different UEs from overlapping each other in a certain range.

Also, in the above equations 1 and 2, the offset value $f(n_{CC}, n_{RNTI})$ that is calculated using the fundamental frequency block-specific index value $n_{CC}$ and the user terminal-specific index value $n_{RNTI}$ can be determined by, for example, the following equation 3.

$$f(n_{CC}, n_{RNTI}) = n_{CC} + K n_{RNTI}, \text{ or } n_{CC} \cdot n_{RNTI} \quad \text{(Equation 3)}$$

In the above equation 3, K is a constant. K may be a fixed value in the system or may be configured to be reported by RRC signaling.

Note that, in the equation 3, using constant B, it is also possible to make $f(n_{CC}, n_{RNTI})$ be the value $(Bn_{CC}+Kn_{RNTI})$ given by adding up the fundamental frequency block-specific offset value and user terminal-specific offset value (in the equation 3, a case where B=1 is assumed). In this case, using the fundamental frequency block-specific offset value and user terminal-specific offset value, the positions of search spaces are controlled such that the search spaces are arranged randomly between fundamental frequency blocks and between user terminals.

In addition, in the equation 3, using constants K, B, it is possible to make $f(n_{CC}, n_{RNTI})$ a value $(K \cdot B \cdot n_{CC} \cdot K n_{RNTI})$ given by multiplying the fundamental frequency block-specific offset value and user terminal-specific offset value (a case is assumed in equation 3 where K=B=1).

Also, it is possible to incorporate the fundamental frequency block-specific index value $n_{CC}$ in K, and, in this case, the above equation 3 can be represented by the equation 3' below:

$$f(n_{CC}, n_{RNTI}) = K' n_{RNTI} \quad \text{(Equation 3')}$$

In the above equation 3', K' is a constant including a fundamental frequency block-specific index value $n_{CC}$. K' may be a fixed value in the system or may be configured to be reported by RRC signaling.

Also, according to another aspect of the present invention, whether or not to calculate the starting position of a search space, according to the CCE aggregation levels, using user terminal-specific offset values, can be controlled. For example, when the CCE aggregation level is equal to or lower than a predetermined value (for example, the number of CCE aggregations=1), the possibility is low that the search spaces of user terminals overlap, so that, using the above equation 3, assuming K=0, the starting position of the search space when CCE aggregation=1 is determined without using user terminal-specific offset values. On the other hand, when the aggregation level is equal to or greater than a predetermined value (for example, the CCE aggregation level=1, 4 or 8), the starting position of a search space when the CCE aggregation level=1, 4 or 8 is determined using user terminal-specific offset values, assuming that K≠0, in the above equation 3. In this way, by controlling whether or not to apply user terminal-specific offset values and determining the starting position of a search space according to the CCE aggregation level, it is possible to provide an advantage of making it possible to independently adjust the possibility that the search spaces overlap at each aggregation level.

Furthermore, according to yet another aspect of the present invention, a configuration to use the above equation 1 and equation 2 selectively according to the CCE aggregation level may be used. For example, when the CCE aggregation level is equal to or lower than a predetermined value (for example, the CCE aggregation level=1 or 2), the starting position of the search space when CCE aggregation level=1 or 2 is controlled using the above equation 1, and when the CCE aggregation level is equal to or higher than a predetermined value (for example, the CCE aggregation level=4 or 8), the starting position of the search space when CCE aggregation level=4 or 8 is controlled using the above equation 2. Then, it is not necessary to make $f(n_{CC}, n_{RNTI})$ the same between the numbers of CCE aggregation level, and it is also possible to make $f(n_{CC}, n_{RNTI})$ different numerical values by changing k according to the CCE aggregation level. In this way, by using the equations to determine the search space starting position depending on the CCE aggregation level, it is possible to provide an advantage of individually adjusting the possibility of overlap of search spaces at the respective aggregation levels.

Note that the method of determining the search space starting position according to the present invention is by no means limited to the above-described method of using user-specific offset values insofar as its configuration is suitably applicable to a communication system where a plurality of component carriers are aggregated into a wide band. For example, according to one mode of the present invention apart from the above-described configuration, it is possible to provide a configuration to determine the search space starting position by taking into account component carrier-specific and user terminal-specific time shifts. In this case, it is possible to determine the search space starting position in cross-carrier scheduling using the equation 7 below in which component carrier-specific and user terminal-specific time shifts are applied to the Hash function.

[Formula 4]

$$S_{k,n_{CC}}^{(L)} = L \cdot \{(Y_{k+x(n_{CC}, n_{RNTI})} + m) \bmod \lfloor N_{CCE,k}/L \rfloor\} + i. \quad \text{(Equation 7)}$$

where $Y_{k+x(n_{CC}, n_{RNTI})} = (A \cdot Y_{k+x(n_{CC}, n_{RNTI})-1}) \bmod D$;

$x(n_{CC}, n_{RNTI})$: the fundamental frequency block-specific and user terminal-specific time offset value;

L: the aggregation level to show the number of control channel elements, where a control channel element is the basic unit upon rate matching of downlink control information and is the minimum unit to form a search space;

i=0, ..., L−1, m=0, ... $M^{(L)}$−1;

$M^{(L)}$: the number of downlink control channel candidates at an aggregation level;

$N_{CCE,k}$: the total number of control channel elements (CCEs) in subframe k in a fundamental frequency block;

$Y_{-1} = n_{RNTI} \neq 0$;

A: constant; and

D: constant.

Note that, in LTE, A=39828 and D=65537.

$x(n_{CC}, n_{RNTI})$ is a constant, and, for example, it is possible to make $x(n_{CC}, n_{RNTI})) = n_{CC}$. Also, $x(n_{CC}, n_{RNTI})$ may be a fixed value in the system or may be configured to be reported by RRC signaling.

Figure 10:
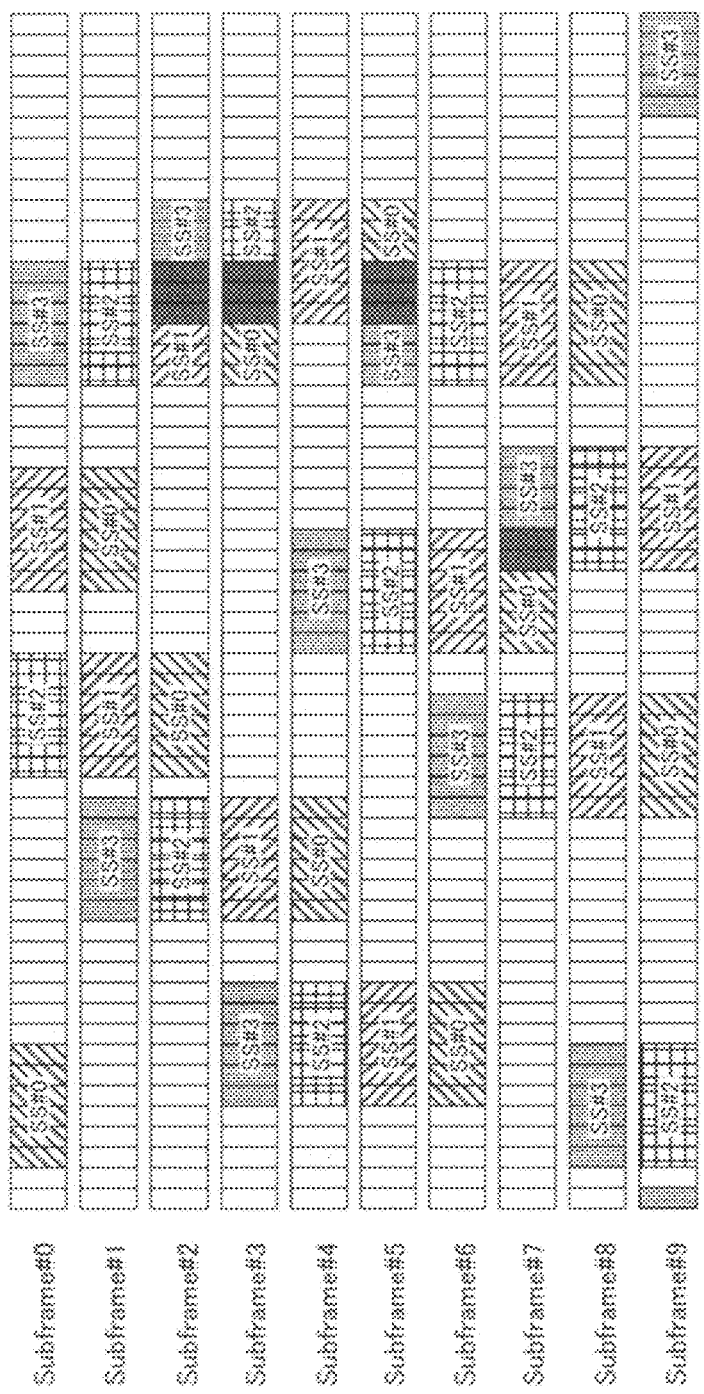
FIG. 10 is a diagram showing a search space configuration using a component carrier-specific time shift.

FIG. 10 shows a case where, in the above equation 7, when the fundamental frequency block-specific time offset value $x(n_{CC}, n_{RNTI}) = n_{CC}$, downlink control information for four different component carriers (CC #0 to CC #3) is grouped in the control channel of a specific component carrier, and search spaces (SS #0 to SS #3) corresponding to the respective downlink control information are arranged.

In subframe #0, when k=0, $n_{CC}$ in component carriers CC #0 to CC #3 is 0 to 3, so that $Y_{k+ncc}$ in component carriers CC #0 to CC #3 is $Y_0, Y_1, Y_2$ and $Y_3$. Also, in subframe #1, when k=1, $n_{CC}$ in component carriers CC #0 to CC #3 is 0 to 3, so that $Y_{k+ncc}$ in component carriers CC #0 to CC #3 is $Y_1, Y_2, Y_3$ and $Y_4$. By performing the same calculation with respect to subframe #2 to subframe #9, it is possible to arrange the search spaces of component carriers as shown in FIG. 10.

Note that, when the value of k is greater than 9 (equal to or greater than 10), the value of k may be reset and then set again to k=0, 1, 2 and so on, or may be increased continuously to k=10, 11, 12 and so on.

As shown in FIG. 10, by controlling the starting positions of search spaces using component carrier-specific time shifts, it is possible to provide a configuration in which the search spaces of different component carriers are shifted in order and arranged in consecutive subframes, so that it is possible to prevent the search spaces of different component carriers from overlapping in the same subframe.

Also, instead of the above equation 7, it is possible to provide a configuration to determine the search space starting position by adding user terminal-specific offset value, as expressed by the following equation (8).

[Formula 5]

$$S_{k,n_{CC}}^{(L)} = L \cdot \{(Y_{k+x(n_{CC})} + m + Kn_{RNTI}) \bmod \lfloor N_{CCE,k}/L \rfloor\} + i \quad \text{(Equation 8)}$$

where $Y_{k+x(n_{CC})} = (A \cdot Y_{k+x(n_{CC})-1}) \bmod D$;

$x(n_{CC})$: the fundamental frequency block-specific time offset value;

$Kn_{RNTI}$ the user terminal-specific offset value;

L: the aggregation level to show the number of control channel elements, where a control channel element is the basic unit upon rate matching of downlink control information and is the minimum unit to form a search space;

i=0, ..., L−1, m=0, ... $M^{(L)}$−1;

$M^{(L)}$: the number of downlink control channel candidates at an aggregation level;

$N_{CCE,k}$: the total number of control channel elements (CCEs) in subframe k in a fundamental frequency block;

$Y_{-1} = n_{RNTI} \neq 0$;

A: constant; and

D: constant.

Note that, in LTE, A=39828 and D=65537.

Now, an embodiment of the present invention will be described below in detail with reference to the accompanying drawings. A case will be described here where a base station and mobile stations supporting an LTE-A system are used, but communication systems other than LTE are equally applicable.

Figure 5:
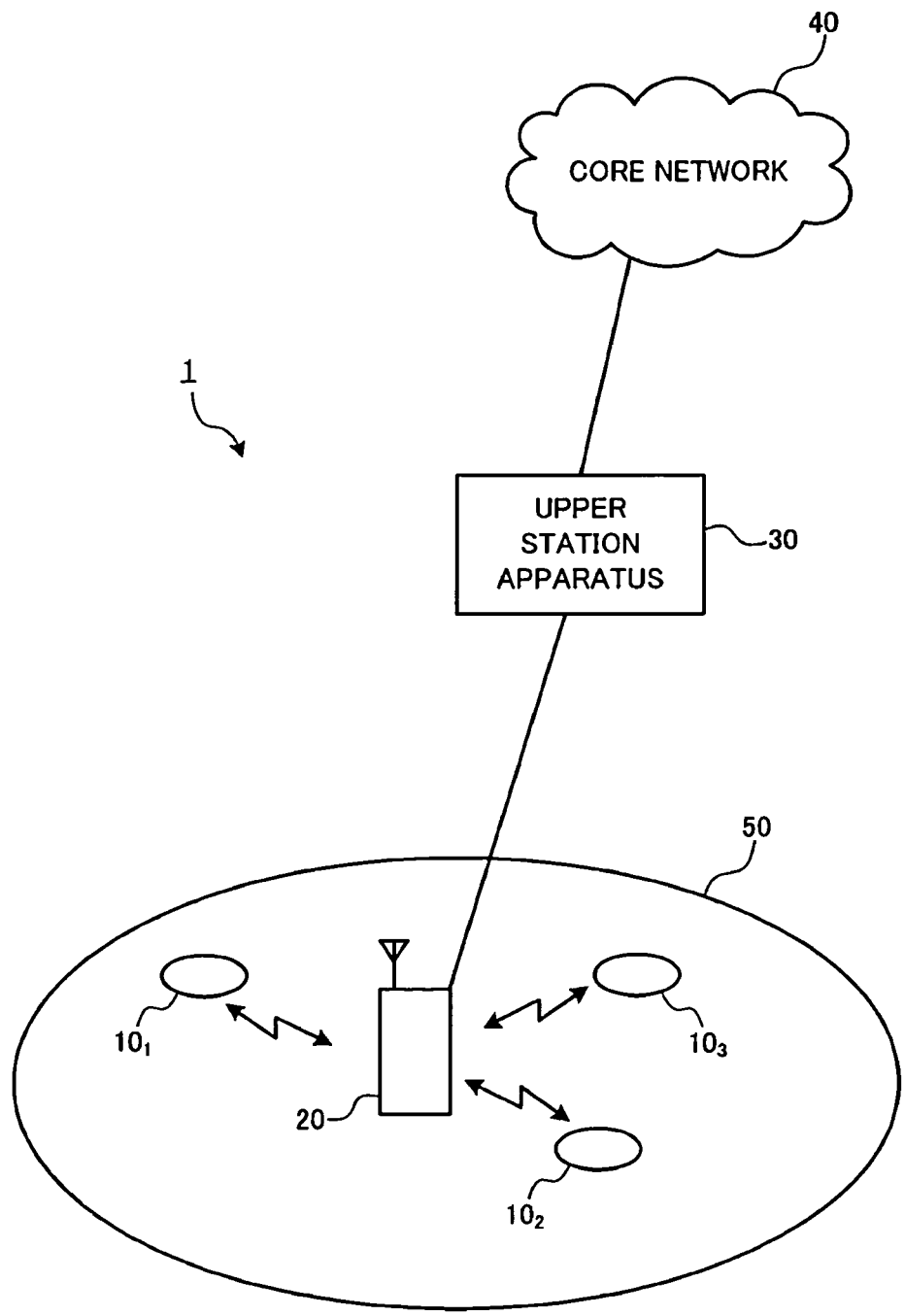
FIG. 5 is an overview of a mobile communication system according to an embodiment.

Referring to FIG. 5, a mobile communication system 1 having a mobile station (UE) 10 and a base station (Node B) 20 according to an embodiment of the present invention will be described. FIG. 5 is a drawing for explaining the configuration of the mobile communication system 1 having mobile stations 10 and base station 20 according to the present embodiment. Note that the mobile communication system 1 illustrated in FIG. 5 is a system to incorporate, for example, an LTE system or SUPER 3G. Also, this mobile communication system 1 may be referred to as "IMT-Advanced" or "4G."

As illustrated in FIG. 5, the mobile communication system 1 is configured to include a base station apparatus 20 and a plurality of mobile terminal apparatuses 10 ($10_1$, $10_2$, $10_3$, ... $10_n$, where n is an integer to satisfy n>0) that communicate with the base station apparatus 20. The base station apparatus 20 is connected with a higher station apparatus 30, and this higher station apparatus 30 is connected with a core network 40. The mobile terminal apparatuses 10 communicate with the base station apparatus 20 in a cell 50. Note that the higher station apparatus 30 includes, for example, an access gateway apparatus, a radio network controller (RNC), a mobility management entity (MME) and so on, but is by no means limited to these. The upper station apparatus 30 may be included in the core network 40.

The mobile terminal apparatuses ($10_1$, $10_2$, $10_3$, ... $10_n$) include both LTE terminals and LTE-A terminals, so that the following descriptions will be given with respect to "mobile station 10," unless specified otherwise. Also, although a mobile terminal apparatus 10 performs radio communication with the base station apparatus 20 for ease of explanation, more generally, user apparatuses (User Equipment) including mobile stations and fixed terminal apparatuses may be used.

In the mobile communication system 1, as radio access schemes, OFDMA (Orthogonal Frequency Division Multiple Access) is applied to the downlink, and SC-FDMA (Single-Carrier Frequency-Division Multiple Access) and clustered DFT-spread OFDM are applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, a system band into bands formed with one or continuous resource blocks, and allowing a plurality of terminals to use mutually different bands. Clustered DFT-spread OFDM is a scheme to realize uplink multiple access by allocating groups (clusters) of discontinuous, clustered subcarriers to one mobile station UE and applying discrete Fourier transform spread OFDM to each cluster.

Here, the communication channels in the LTE and LTE-A systems will be described. The downlink communication channels include the PDSCH, which is used by each mobile terminal apparatus 10 on a shared basis, and downlink L1/L2 control channels (including the PDCCH, PCFICH and PHICH). This PDSCH transmits user data and higher control signals. The higher control signals include RRC signaling to report the increase/decrease of the number of carrier aggregations, the uplink radio access scheme (SC-FDMA/clustered DFT-spread OFDM) to be applied to each component carrier, to the mobile terminal apparatus 10. Also, it is equally possible to provide a configuration in which, when the search space starting position is controlled in the mobile terminal apparatus based on information reported from the base station apparatus, the above-described information related to a control equation to determine the search space starting position (for example, constant K and so on) is reported to the mobile terminal apparatus through RRC signaling. Then, it is equally possible to provide a configuration to report the fundamental frequency block-specific offset value $n_{CC}$ at the same time by RRC signaling.

The uplink communication channels include the PUSCH, which is used by each mobile terminal apparatus 10 on a shared basis, and the PUCCH (Physical Uplink Control Channel), which is an uplink control channel. User data is transmitted by this PUSCH. The PUCCH transmits downlink radio quality information (CQI: Channel Quality Indicator), ACK/NACK and so on, and, although intra-subframe frequency hopping applies in SC-FDMA, in clustered DFT-spread OFDM, intra-subframe frequency hopping does not apply, because a frequency scheduling effect can be achieved without intra-subframe frequency hopping.

Figure 6:
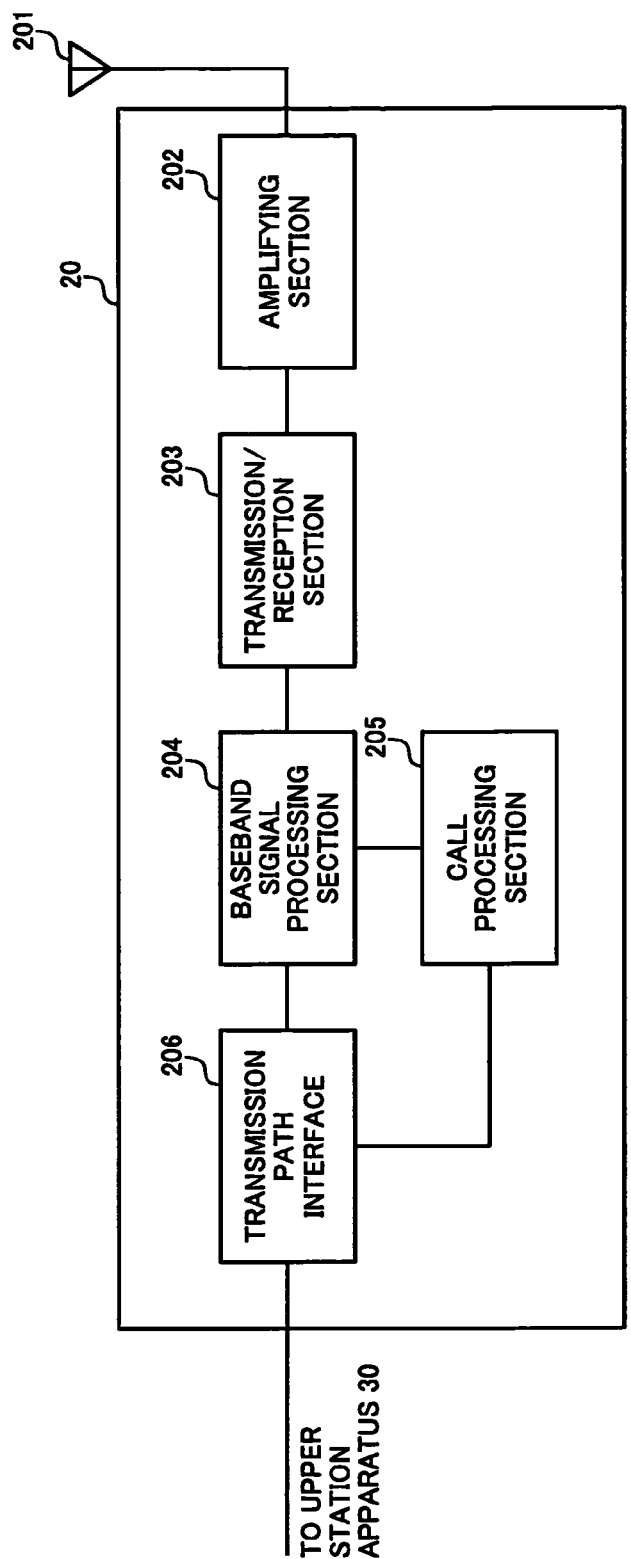
FIG. 6 is a schematic configuration diagram of a base station apparatus according to an embodiment.

An overall configuration of the base station apparatus 20 according to the present embodiment will be described with reference to FIG. 6. The base station apparatus 20 has a transmitting/receiving antenna 201, an amplifying section 202, a transmission/reception section 203, a baseband signal processing section 204, a call processing section 205 and a transmission path interface 206.

User data to be transmitted from the base station apparatus 20 to the mobile terminal apparatus 10 on the downlink is input from the higher station apparatus 30 in the baseband signal processing section 204, via the transmission path interface 206.

In the baseband signal processing section 204, PDCP layer processing, division and coupling of user data, RLC (Radio Link Control) layer transmission processing such as RLC retransmission control transmission processing, MAC (Medium Access Control) retransmission control, including, for example, HARQ (Hybrid Automatic Repeat reQuest) transmission processing, scheduling, transport format selection, channel coding, inverse fast Fourier transform (IFFT) processing, and precoding processing, are performed. Furthermore, as with signals of the physical downlink control channel, which is a downlink control channel, transmission processing such as channel coding and inverse fast Fourier transform is performed.

Also, the baseband signal processing section 204 reports control information for allowing each mobile terminal apparatus 10 to radio-communicate with the base station apparatus 20, to the mobile terminal apparatuses 10 connected to the same cell 50, by a broadcast channel. Broadcast information for communication in the cell 50 includes, for example, the uplink or downlink system bandwidths, identification information of a root sequence (root sequence index) for generating random access preamble signals in the PRACH, and so on.

In the transmission/reception section 203, the baseband signal output from the baseband signal processing section 204 is subjected to frequency conversion into a radio frequency band. The amplifying section 202 amplifies the transmission signal subjected to frequency conversion, and outputs the result to the transmitting/receiving antenna 201.

Meanwhile, as for a radio frequency signal to be transmitted on the uplink from the mobile terminal apparatus 10 to the base station apparatus 20, the signal is received in the transmitting/receiving antenna 201, amplified in the amplifying section 202, subjected to frequency conversion and converted into a baseband signal in the transmission/reception section 203, and is input to the baseband signal processing section 204.

The baseband signal processing section 204 performs FFT processing, IDFT processing, error correction decoding, MAC retransmission control reception processing, and RLC layer and PDCP layer reception processing on the user data included in the baseband signal that is received on the uplink. The decoded signal is transferred to the higher station apparatus 30 through the transmission path interface 206.

The call processing section 205 performs call processing such as setting up and releasing a communication channel, manages the state of the base station apparatus 20 and manages the radio resources.

Figure 7:
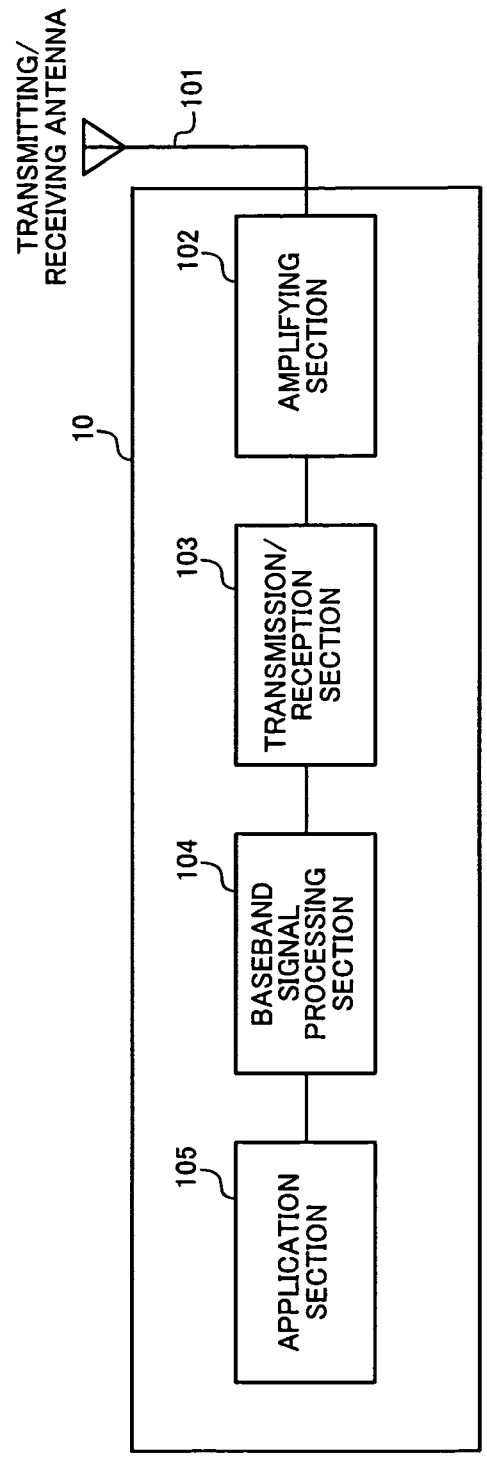
FIG. 7 is a schematic configuration diagram of a mobile terminal apparatus according to an embodiment.

Next, referring to FIG. 7, an overall configuration of the mobile terminal apparatus 10 according to the present embodiment will be described. An LTE terminal and an LTE-A terminal have the same hardware configurations in the principle parts, and therefore will be described indiscriminately. The mobile terminal apparatus 10 has a transmitting/receiving antenna 101, an amplifying section 102, a transmission/reception section 103, a baseband signal processing section 104, and an application section 105.

As for downlink data, a radio frequency signal that is received in the transmitting/receiving antenna 101 is amplified in the amplifying section 102, and subjected to frequency conversion into a baseband signal in the transmission/reception section 103. This baseband signal is subjected to reception processing such as FFT processing, error correction decoding and retransmission control and so on in the baseband signal processing section 104. In this downlink data, downlink user data is transferred to the application section 105. The application section 105 performs processing related to higher layers above the physical layer and the MAC layer. Also, in the downlink data, broadcast information is also transferred to the application section 105.

On the other hand, uplink user data is input from the application section 105 to the baseband signal processing section 104. In the baseband signal processing section 104, retransmission control (HARQ (Hybrid ARQ)) transmission processing, channel coding, DFT processing, IFFT processing and so on are performed. The baseband signal output from the baseband signal processing section 104 is converted into a radio frequency band in the transmission/reception section 103, and, after that, amplified in the amplifying section 102 and transmitted from the transmitting/receiving antenna 101.

Figure 8:
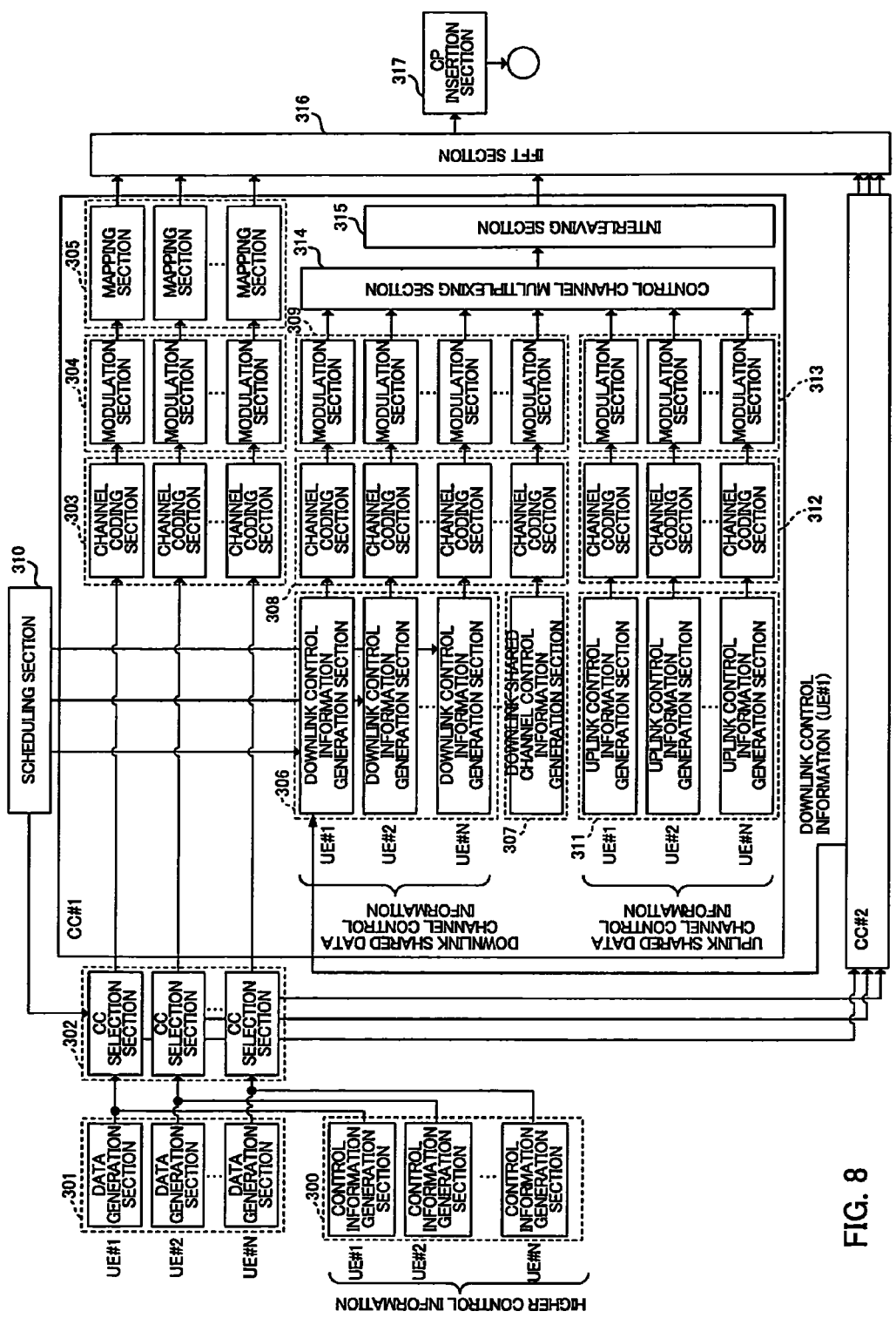
FIG. 8 is a functional block diagram of a transmission processing section in a baseband signal processing section of a base station apparatus according to an embodiment.

FIG. 8 is a functional block diagram of the baseband signal processing section 204 and part of the higher layers provided in the base station apparatus 20 according to the present embodiment, and primarily illustrates the function blocks of the transmission processing section in the baseband signal processing section 204. FIG. 8 illustrates an example of a base station configuration which can support two component carriers (CC #1 and CC #2). Transmission data for the mobile terminal apparatus 10 under the base station apparatus 20 is transferred from the higher station apparatus 30 to the base station apparatus 20.

FIG. 8 shows a case where PDSCHs are assigned to component carriers CC #1 and CC #2, respectively, and PDCCHs, which are control information related to these PDSCHs, are transmitted together in the component carrier CC #1. Note that the number of component carriers is not limited to two and three or a greater number of multiple component carriers can be set. According to one aspect of the present invention, in the LTE-A system, when the system band is formed with a plurality of component carriers, the search spaces of the component carriers constituting the system band are mapped to the downlink control channel of a specific component carrier. In this case, it is possible to map the search spaces of all the component carriers to one component carrier, or it is equally possible to divide a plurality of component carriers to constitute the system band into a plurality of groups, and map the search spaces of the component carriers in the same group to one component carrier in the same group.

A control information generation section 300 generates higher control signals for performing higher layer signaling (for example, RRC signaling), on a per-user basis. The higher control signals may include a command to request addition/removal of component carriers CC. Also, it is possible to provide a configuration to report the above-described information related to a control equation to determine the search space starting position (for example, constant K and so on) to the mobile terminal apparatus through RRC signaling.

A data generation section 301 outputs transmission data transferred from the higher station apparatus 30 separately as user data.

A component carrier selection section 302 selects, on a per-user basis, component carriers to use for radio communication with the mobile terminal apparatus 10. As described above, addition/removal of component carriers is reported from the base station apparatus 20 to the mobile terminal apparatus 10 by RRC signaling, and a complete message is received from the mobile terminal apparatus 10. As this complete message is received, assignment (addition/removal) of component carriers to that user is fixed, and the fixed component carrier assignment is set in the component carrier selection section 302 as component carrier assignment information. In accordance with the component carrier assignment information that is set in the component carrier selection section 302 on a per-user basis, higher control signals and transmission data are allocated to component carrier channel coding sections 303 of the applicable component carriers. Also, from among a plurality of component carriers used in radio communication with the mobile terminal apparatus 10, a specific component carrier (hereinafter referred to as "SS-aggregation component carrier"), in which downlink control information (PDCCHs) for demodulating the data channels, transmitted separately for each of a plurality of component carriers, is grouped, is selected. Search spaces corresponding to the PDCCHs to be grouped are assigned to the SS-aggregation component carrier. In FIG. 8, component carrier CC #1 becomes the SS-aggregation component carrier.

A scheduling section 310 controls assignment of component carriers to a serving mobile terminal apparatus 10 according to overall communication quality of the system band. The scheduling section 310 determines addition/removal of component carriers to assign for communication with the mobile terminal apparatus 10. A decision result related to addition/removal of component carriers is reported to the control information generation section 300. Also, an SS-aggregation component carrier is determined from the component carriers selected per user terminal. The SS-aggregation component carrier may be switched dynamically or may be switched semi-statically.

Also, the scheduling section 310 functions as a determining section that determines a search space to be a candidate area where downlink control information is arranged, per fundamental frequency block, and, also, using the fundamental frequency block-specific offset values and user terminal-specific offset values, controls the search space starting positions, with respect to the control channel of the SS-aggregation component carrier, such that the search spaces are separate between fundamental frequency blocks and between user terminals. The search space starting positions can be calculated using the above equations 1, 2 and so on. Besides, it is also possible to determine the starting position of a search space using the above equations 7, 8 and so on using component carrier-specific time shifts.

Also, the scheduling section 310 controls resource allocation in component carriers CC #1 to CC #2. The LTE terminal user and the LTE-A terminal user are scheduled separately. Also, the scheduling section 310 receives as input the transmission data and retransmission command from the higher station apparatus 30, and also receives as input the channel estimation values and resource block CQIs from the reception section having measured an uplink received signal. The scheduling section 310 schedules downlink assignment information, uplink assignment information and uplink/downlink shared channel signals, with reference to the retransmission command, channel estimation values and CQIs that are received as input from the higher station apparatus 30. A propagation path in mobile communication varies differently per frequency, due to frequency selective fading. So, upon transmission of user data to the mobile terminal apparatus 10, resource blocks of good communication quality are assigned to each mobile terminal apparatus 10, on a per-subframe basis (which is referred to as "adaptive frequency scheduling"). In adaptive frequency scheduling, for each resource block, a mobile terminal apparatus 10 of good propagation path quality is selected and assigned. Consequently, the scheduling section 310 assigns resource blocks, with which improvement of throughput is anticipated, using the CQI of each resource block, fed back from each mobile terminal apparatus 10. Also, the CCE aggregation level is controlled according to the propagation path conditions with the mobile terminal apparatus 10. The CCE aggregation level is increased with respect to cell edge users. Also, the MCS (Coding rate and Modulation Scheme) to fulfill a required block error rate with the assigned resource blocks is determined. Parameters to fulfill the MCS (Coding rate and Modulation Scheme) determined by the scheduling section 310 are set in channel coding sections 303, 308 and 312, and in modulation sections 304, 309 and 313.

The baseband signal processing section 204 has channel coding sections 303, modulation sections 304, and mapping sections 305, to match the maximum number of users to be multiplexed, N, in one component carrier. The channel coding section 303 performs channel coding of the shared data channel (RDSCH), formed with user data (including part of higher control signals) that is output from the data generation section 301, on a per-user basis. The modulation section 304 modulates user data having been subjected to channel coding, on a per-user basis. The mapping section 305 maps the modulated user data to radio resources.

Also, the baseband signal processing section 204 has a downlink control information generation section 306 that generates downlink shared data channel control information, which is user-specific downlink control information, and a downlink shared channel control information generation section 307 that generates downlink shared control channel control information, which is user-common downlink control information.

Downlink assignment information (D0) of DCI format 1 is downlink shared data channel control information. The downlink control information generation section 306 generates downlink control information (for example, DCI format 1), formed with downlink assignment information, from the resource allocation information, MCS information, HARQ information, PUCCH transmission power control command, and so on, determined on a per-user basis. The downlink control information (for example, DCI format 1) is arranged in the search space of which the starting position is determined by application of the present invention.

The baseband signal processing section 204 has channel coding sections 308 and modulation sections 309 to match the maximum number of users to be multiplexed, N, in one component carrier. The channel coding section 308 performs channel coding of control information generated in the downlink control information generation section 306 and downlink shared channel control information generation section 307, on a per-user basis. The modulation section 309 modulates the downlink control information after channel coding.

Also, the baseband signal processing section 204 has an uplink control information generation section 311 that generates, on a per-user basis, uplink shared data channel control information, which is control information for controlling the uplink shared data channel (PUSCH), a channel coding section 312 that performs, on a per-user basis, channel coding on uplink shared data channel control information generated, and a modulation section 313 that modulates, on a per-user basis, uplink shared data channel control information having been subjected to channel coding.

The downlink control information (U0) formed with the uplink assignment information of DCI format 0 is uplink shared data channel control information. The uplink control information generation section 311 generates uplink assignment information from uplink resource allocation information (single carrier/cluster) that is determined per user, MCS information and redundancy version (RV), an identifier (new data indicator) to identify new data or retransmission data, a PUSCH transmission power control command (TPC), cyclic shift for the demodulation reference signal (CS for DMRS), CQI request, and so on. In subframes (component carriers) where SC-FDMA is selected for the uplink radio access scheme, downlink control information (U0) formed with uplink assignment information of DCI format 0 is generated according to the rules defined in LTE. The downlink control information (for example, DCI format 0) can be arranged in the search space where the starting position is determined according to the present invention.

The control information that is modulated on a per-user basis in the above modulation sections 309 and 313 is multiplexed in a control channel multiplexing section 314 and furthermore interleaved in an interleaving section 315. A control signal that is output from the interleaving section 315 and user data that is output from the mapping section 305 are input in an IFFT section 316 as a downlink channel signal. The IFFT section 316 converts the downlink channel signal from a frequency domain signal into a time sequence signal by performing an inverse fast Fourier transform. A cyclic prefix insertion section 317 inserts cyclic prefixes in the time sequence signal of the downlink channel signal. Note that a cyclic prefix functions as a guard interval for cancelling the differences in multipath propagation delay. The transmission data to which cyclic prefixes are added, is transmitted to the transmission/reception section 203.

Figure 9:
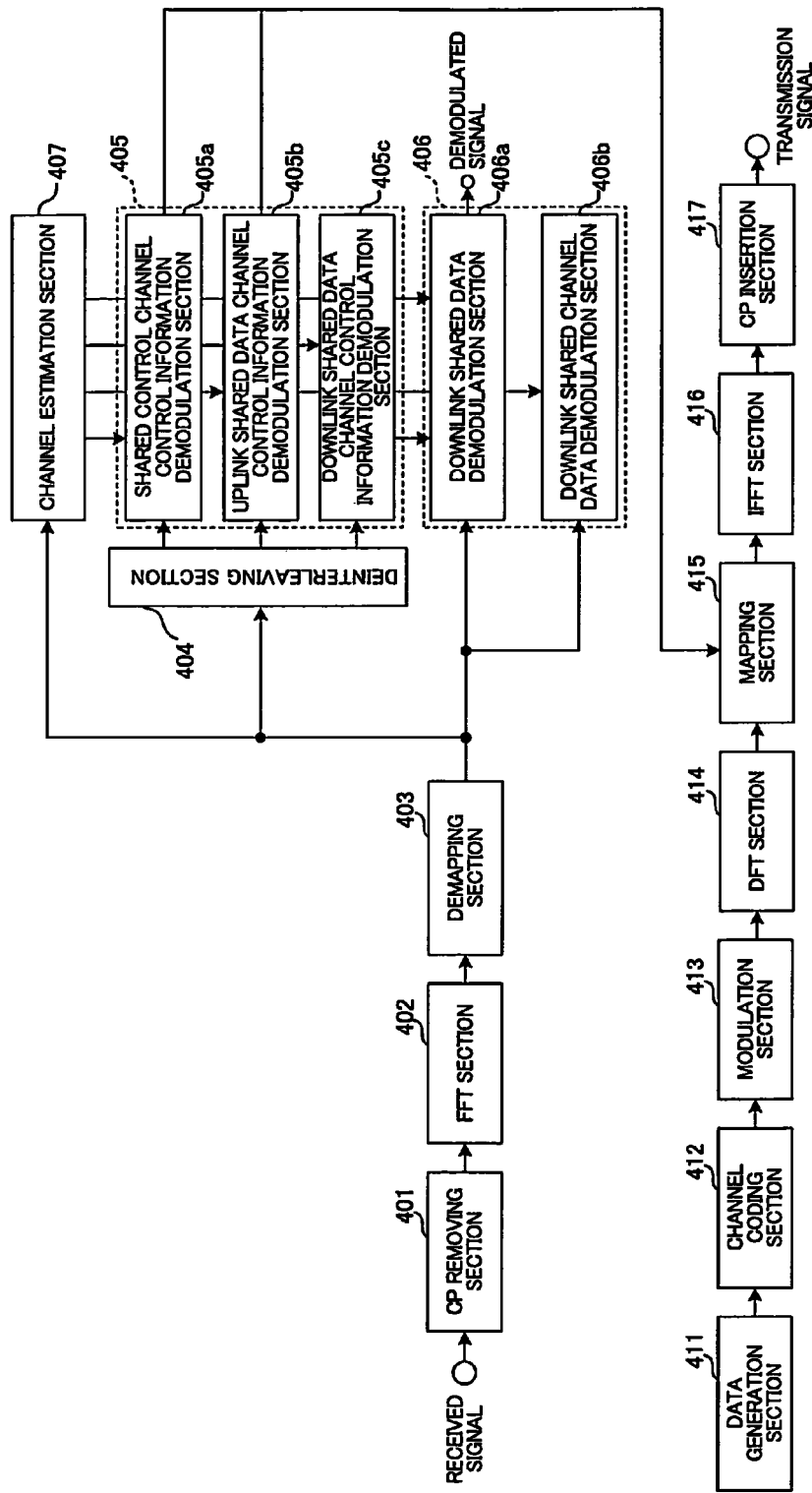
FIG. 9 is a functional block diagram of a baseband signal processing section provided in a mobile terminal apparatus according to an embodiment.

FIG. 9 is a functional block diagram of the baseband signal processing section 104 provided in the mobile terminal apparatus 10, illustrating function blocks of an LTE-A terminal which supports LTE-A. First, the downlink configuration of the mobile terminal apparatus 10 will be described.

A CP removing section 401 removes the CPs from a downlink signal received from the radio base station apparatus 20 as received data. The downlink signal, from which the CPs have been removed, is input in an FFT section 402. The FFT section 402 performs a fast Fourier transform (FFT) on the downlink signal, converts the time-domain signal into a frequency domain signal, and inputs the frequency domain signal in a demapping section 403. The demapping section 403 demaps the downlink signal, and extracts, from the downlink signal, multiplex control information in which a plurality of pieces of control information are multiplexed, user data, and higher control signals. Note that the demapping process by the demapping section 403 is performed based on higher control signals that are received as input from the application section 105. Multiplex control information that is output from the demapping section 403 is deinterleaved in a deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section 405a that demodulates downlink shared control channel control information from the downlink control channel, an uplink shared data channel control information demodulation section 405b that demodulates uplink shared data channel control information by performing blind decoding of the search space according to the present invention from the downlink control channel, and a downlink shared data channel control information demodulation section 405c that demodulates downlink shared data channel control information by performing blind decoding of the search space according to the present invention from the downlink control channel. The data demodulation section 406 includes a downlink shared data demodulation section 406a that demodulates the user data and higher control signals, and a downlink shared channel data demodulation section 406b that demodulates downlink shared channel data.

The shared control channel control information demodulation section 405a extracts shared control channel control information, which is user-common control information, by the blind decoding process, demodulation process, channel decoding process and so on of the common search space of the downlink control channel (PDCCH). The shared control channel control information includes downlink channel quality information (CQI), and therefore is input in a mapping section 415 (described later), and mapped as part of transmission data for the radio base station apparatus 20.

The uplink shared data channel control information demodulation section 405b extracts uplink shared data channel control information, which is user-specific uplink assignment information, by the blind decoding process, demodulation process, channel decoding process and so on, of the user-specific search spaces of the downlink control channel (PDCCH). In particular, as for the user-specific search spaces, as described above, the search spaces of a plurality of component carriers are grouped in the PDCCH of the SS-aggregation component carrier, so that which component carrier's control information the demodulated DCI is, is determined using the CIFs. The uplink allocation information is used to control the uplink shared data channel (PUSCH), and is input in the downlink shared channel data demodulation section 406b.

The downlink shared data channel control information demodulation section 405c extracts uplink shared data channel control information, which is user-specific downlink control signals, by the blind decoding process, demodulation process, channel decoding process and so on, of the user-specific search spaces of the downlink control channel (PDCCH). In particular, as for the user-specific search spaces, as described above, the search spaces of a plurality of component carriers are grouped in the PDCCH of the SS-aggregation component carrier, so that which component carrier's control information the demodulated DCI is, is determined using the CIFs. The downlink shared data channel control information is used to control the downlink shared data channel (PDSCH), and is input in the downlink shared data demodulation section 406a.

Also, the downlink shared data channel control information demodulation section 405c performs the blind decoding process of the user-specific search spaces, based on information which relates to the PDCCH and PDSCH and which is included in the higher control signals demodulated in the downlink shared data demodulation section 406a. Also, in the event the above-described information related to a control equation to determine the search space starting position (for example, constant K and so on) is reported to the mobile terminal apparatus through RRC signaling, based on the reported information, the user-specific search apace is specified and blind decoding process is performed.

The downlink shared data demodulation section 406a acquires the user data, higher control information and so on, based on the downlink shared data channel control information received as input from the downlink shared data channel control information demodulation section 405c. The higher control information (including mode information) is output to the channel estimation section 407. The downlink shared channel data demodulation section 406b demodulates downlink shared channel data based on the uplink shared data channel control information that is input from uplink shared data channel control information demodulation section 405b.

The channel estimation section 407 performs channel estimation using common reference signals or user terminal-specific reference signals. The estimated channel variation is output to the shared control channel control information demodulation section 405a, the uplink shared data channel control information demodulation section 405b, the downlink shared data channel control information demodulation section 405c and the downlink shared data demodulation section 406a. These demodulation sections demodulate downlink allocation information using the estimated channel variation and demodulation reference signals.

The baseband signal processing section 104 has, as function blocks of the transmission processing system, a data generation section 411, a channel coding section 412, a modulation section 413, a DFT section 414, a mapping section 415, an IFFT section 416, and a CP insertion section 417. The data generation section 411 generates transmission data from bit data that is received as input from the application section 105. The channel coding section 412 applies channel coding processing such as error correction to the transmission data, and the modulation section 413 modulates the transmission data subjected to channel coding by QPSK and so on. The DFT section 414 performs a discrete Fourier transform on the modulated transmission data. The mapping section 415 maps the frequency components of the data symbols after the DFT, to the subcarrier positions designated by the base station apparatus. The IFFT section 416 performs an inverse fast Fourier transform on input data to match the system band and converts the input data into time sequence data, and the CP insertion section 417 inserts cyclic prefixes in the time sequence data per data segment.

Next, the control of search spaces to arrange downlink control information (DCI) of a plurality of component carriers CC #1 to CC #3 in the event the CC #1 to CC #3 are allocated to the system band to use in radio communication between a plurality of mobile station apparatuses 10$_1$ and 10$_2$ (UE #1 and UE #2) and the base station apparatus 20 will be described in detail.

The scheduling section 310 controls assignment of component carriers to the serving mobile terminal apparatuses 10$_1$ and 10$_2$ according to overall communication quality of the system band. For example, in the scheduling section 310, the component carrier selection section 302 selects component carriers CC #1 to CC #3 to be used in radio communication with the mobile terminal apparatus 10$_1$, and selects component carriers CC #1 to CC #3 to be used in radio communication with the mobile terminal apparatus 10$_2$. Addition/removal of component carriers is reported from the base station apparatus 20 to the mobile terminal apparatus 10 by RRC signaling, and a complete message is received from the mobile terminal apparatus 10. As this complete message is received, assignment (addition/removal) of component carriers to that user is fixed, and the fixed component carrier assignment is set in the component carrier selection section 302 as component carrier assignment information. Also, the scheduling section 310 determines a SS-aggregation component carrier (for example, CC #1) from component carriers selected for each of a plurality of mobile station apparatuses 10$_1$ and 10$_2$, and, using fundamental frequency block-specific offset values and user terminal-specific offset values, controls the search space starting positions in the control channel of the SS-aggregation component carrier such that the search spaces are separate between fundamental frequency blocks and between user terminals. The starting positions of search spaces can be calculated using the above equations 1 and 2 and so on. Besides, it is also possible to determine the starting positions of search spaces using the above equations 7 and 8 and so on using component carrier-specific time shifts.

In the baseband processing section 204, the downlink control information generation sections 306 (UE #1) and (UE #2) of component carriers CC #1 to CC #3 each generate downlink control information, and the uplink control information generation sections 311 (UE #1) and (UE #2) each generate uplink control information. A CIF is attached to each of these control information pieces. The generated control information is passed to the downlink control information generation sections 306 (UE #1) and (UE #2) and the uplink control information generation sections 311 (UE #1) and (UE #2) of the SS-aggregation component carrier (CC #1). The downlink control information generation sections 306 (UE #1) and (UE #2) and uplink control information generation sections 311 (UE #1) and (UE #2) of the SS-aggregation component carrier (CC #1) arrange downlink control information and uplink control information in the search spaces.

The search spaces are arranged in the control channel multiplexing section 314 such that the control information generated in the downlink control information generation section 306 (UE #1) of the mobile station apparatus 10$_1$ and the control information generated in the downlink control information generation section 306 (UE #2) of the mobile station apparatus 10$_2$ do not overlap each other.

Meanwhile, the mobile terminal apparatuses 10$_1$ and 10$_2$ each receive the PDCCH on the downlink. The deinterleaving section 404 deinterleaves the PDCCH mapped to the top first to third OFDM symbols in the subframe. In the mobile terminal apparatuses 10$_1$ and 10$_2$, since the rate matching parameter (the number of CCEs) and the CCE starting positions are not clear, the control information demodulation section 405 performs blind decoding of search space that are specified by using the above-described control equation to determine the search space starting positions based on information that is reported by RRC signaling or a fixed value in the system, and searches for CCEs where the CRC masked by the user ID is OK.

The downlink shared data channel control information demodulation section 405c searches for shared data channel control information for the subject apparatus by performing blind decoding on the search space of the PDCCH. Then, since the SS-aggregation component carrier CC #1 has already been reported, PDCCH blind decoding is not performed with respect to component carriers CC #2 and CC #3 where the PDCCH is not transmitted. Downlink control information is demodulated by performing blind decoding of the control channel of component carrier CC #1. Control information of component carriers CC #1 to CC #3 is specified based on the CIFs attached to the downlink control information.

The disclosure of Japanese Patent Application No. 2010-105948, filed on Apr. 30, 2010, including the specification, drawings, and abstract, is incorporated herein by reference in its entirety.

The invention claimed is:

1. A base station apparatus comprising:
a control information generation section configured to generate, per fundamental frequency block, a downlink control information piece for demodulating a data channel that is transmitted on each of a plurality of fundamental frequency blocks assigned to a user terminal;
a determining section configured to determine, per fundamental frequency block, a search space which is a candidate area where the downlink control information piece is arranged; and
a transmission section configured to transmit a downlink control channel in which the search space containing the downlink control information piece is arranged, wherein:
the control information generation section arranges respective downlink control information pieces corresponding to the fundamental frequency blocks in the downlink control channel of a specific fundamental frequency block among the fundamental frequency blocks; and
using at least a fundamental frequency block-specific offset value out of the fundamental frequency block-specific offset value and a user terminal-specific offset value, the determining section distributes positions of search spaces such that the search spaces are separate between the fundamental frequency blocks and between user terminals.

2. The base station apparatus as defined in claim 1, wherein the determining section determines a starting position of the search space using a following equation:

$$S_k^{(L)}=L\{(Y_k+m+f(n_{CC},n_{RNTI}))\bmod \lfloor N_{CCE,k}/L \rfloor\}+i$$

where $Y_k=(A \cdot Y_{k-1}) \bmod D$;
$f(n_{CC}, n_{RNTI})$ is an offset value that is calculated using a fundamental frequency block-specific index value $n_{CC}$ and a user terminal-specific index value $n_{RNTI}$;
L is an aggregation level to show the number of control channel elements, where a control channel element is a basic unit upon rate matching of downlink control information and is a minimum unit to form the search space;
$i=0, \ldots, L-1, m=0, \ldots M^{(L)}-1$;
$M^{(L)}$ is the number of downlink control channel candidates at each aggregation level;
$N_{CCE,k}$ is a total number of control channel elements (CCEs) in subframe k in a fundamental frequency block;
$Y_{-1}=n_{RNTI} \neq 0$; and
A is a constant and D is a constant.

3. The base station apparatus as defined in claim 1, wherein the determining section determines a starting position of the search space using a following equation:

$$S_k^{(L)}=L\{(Y_k+m)) \bmod \lfloor N_{CCE,k}/L \rfloor\}+i$$

where $Y_k=(A(Y_{k-1}+f(n_{CC},n_{RNTI}))) \bmod D$,
$f(n_{CC}, n_{RNTI})$ is an offset value that is calculated using a fundamental frequency block-specific index value $n_{CC}$ and a user terminal-specific index value $n_{RNTI}$;
L is an aggregation level to show the number of control channel elements, where a control channel element is a basic unit upon rate matching of downlink control information and is a minimum unit to form the search space;
$i=0, \ldots, L-1, m=0, \ldots M^{(L)}-1$;
$M^{(L)}$ is the number of downlink control channel candidates at each aggregation level;
$N_{CCE,k}$ is a total number of control channel elements (CCEs) in subframe k in a fundamental frequency block;
$Y_{-1}=n_{RNTI} \neq 0$; and
A is a constant and D is a constant.

4. The base station apparatus as defined in claim 2, wherein the offset value $f(n_{CC}, n_{RNTI})$ that is calculated using the fundamental frequency block-specific index value $n_{CC}$ and the user terminal-specific index value $n_{RNTI}$ is determined by a following equation:

$$f(n_{CC},n_{RNTI})=n_{CC}+Kn_{RNTI} \text{ or } n_{CC} \cdot n_{RNTI}$$

where K is a constant.

5. The base station apparatus as defined in claim 4, wherein, when the aggregation level is equal to or lower than a predetermined value, K=0 is assumed and the starting position of the search space is determined without using the user terminal-specific offset value, and, when the aggregation level is equal to or greater than the predetermined value, K≠0 is assumed the starting position of the search space is determined using the user terminal-specific offset value.

6. The base station apparatus as defined in claim 1, wherein, when an aggregation level to show the number of control channel elements is equal to or lower than a predetermined value, the determining section determines a starting position of the search space using a following equation 4:

$$S_k^{(L)}=L\{(Y_k+m+f(n_{CC},n_{RNTI}))\bmod \lfloor N_{CCE,k}/L \rfloor\}+i$$

where $Y_k=(A \cdot Y_{k-1}) \bmod D$; and when the aggregation level is equal to or greater than the predetermined value, the determining section determines the starting position of the search space using a following equation:

$$S_k^{(L)}=L\{(Y_k+m)) \bmod \lfloor N_{CCE,k}/L \rfloor\}+i$$

where $Y_k=(A(Y_{k-1}+f(n_{CC},n_{RNTI}))) \bmod D$;
$f(n_{CC}, n_{RNTI})$ is an offset value that is calculated using a fundamental frequency block-specific index value $n_{CC}$ and a user terminal-specific index value $n_{RNTI}$;
L is an aggregation level to show the number of control channel elements, where a control channel element is a basic unit upon rate matching of downlink control information and is a minimum unit to form the search space;
$i=0, \ldots, L-1, m=0, \ldots M^{(L)}-1$;
$M^{(L)}$ is the number of downlink control channel candidates at each aggregation level;
$N_{CCE,k}$ is a total number of control channel elements (CCEs) in subframe k in a fundamental frequency block;
$Y_{-1}=n_{RNTI} \neq 0$; and
A is a constant and D is a constant.

7. The base station apparatus as defined in claim 6, wherein the offset value $f(n_{CC}, n_{RNTI})$ that is calculated using the fundamental frequency block-specific index value $n_{CC}$ and the user terminal-specific index value $n_{RNTI}$ is determined by a following equation:

$$f(n_{CC},n_{RNTI})=n_{CC}+Kn_{RNTI}, \text{ or } n_{CC} \cdot n_{RNTI}$$

where K is a constant.

8. The base station apparatus as defined in claim 1, wherein, using a time offset value as the fundamental frequency block-specific offset value, the determining section distributes the positions of the search spaces such that the search spaces are separate between the fundamental frequency blocks.

9. The base station apparatus as defined in claim 8, wherein the determining section determines a starting position of the search space using a following equation:

$$S_{k,n_{CC}}^{(L)}=L\cdot\{(Y_{k+x(n_{CC},n_{RNTI})}+m) \bmod \lfloor N_{CCE,k}/L \rfloor\}+i$$

where $Y_{k+x(n_{CC},n_{RNTI})}=(A \cdot Y_{k+x(n_{CC},n_{RNTI})-1}) \bmod D$;
$x(n_{CC}, n_{RNTI})$ is a fundamental frequency block-specific time offset value calculated using a fundamental frequency block-specific index value $n_{CC}$ and a user terminal-specific index value $n_{RNTI}$;
L is an aggregation level to show the number of control channel elements, where a control channel element is a basic unit upon rate matching of downlink control information and is a minimum unit to form the search space;
$i=0, \ldots, L-1, m=0, \ldots M^{(L)}-1$;
$M^{(L)}$ is the number of downlink control channel candidates at each aggregation level;
$N_{CCE,k}$ is a total number of control channel elements (CCEs) in subframe k in a fundamental frequency block;
$Y_{-1}=n_{RNTI} \neq 0$; and
A is a constant and D is a constant.

10. A user terminal comprising:
a receiving section configured to receive data channels that are transmitted individually on a plurality of fundamental frequency blocks constituting a system band, and downlink control information pieces for demodulating the respective data channels, the downlink control information pieces being arranged in a downlink control channel of a specific fundamental frequency block among the fundamental frequency blocks;
a control information demodulation section configured to demodulate the downlink control information pieces for the fundamental frequency blocks by determining, per fundamental frequency block, a search space which is a candidate area where the downlink control information is arranged and performing blind decoding; and a data demodulation section configured to, using the downlink control information pieces of the fundamental frequency blocks demodulated in the control information demodulation section, demodulate the data channels of the fundamental frequency blocks, where the control information demodulation section determines a position of the search space using a fundamental frequency block-specific offset value and a user terminal-specific offset value.

11. The user terminal as defined in claim 10, wherein a constant K, which is used to calculate the user terminal-specific offset value, is stored as a fixed value.

12. The user terminal as defined in claim 10, wherein a constant K, which is used to calculate the user terminal-specific offset value, is reported using a higher control signal.

13. A communication control method comprising the steps of:

generating, per fundamental frequency block, a downlink control information piece for demodulating a data channel that is transmitted on each of a plurality of fundamental frequency blocks assigned to a user terminal;

arranging respective downlink control information pieces corresponding to the fundamental frequency blocks in a downlink control channel of a specific fundamental frequency block among the fundamental frequency blocks; and determining, per fundamental frequency block, a search space which is a candidate area where the downlink control information piece of each of the fundamental frequency blocks is arranged, in the downlink control channel of the specific fundamental frequency block, wherein, using a fundamental frequency block-specific offset value and a user terminal-specific offset value, search spaces are arranged such that the search spaces are separate between fundamental frequency blocks and between user terminals.

14. The base station apparatus as defined in claim 3, wherein the offset value $f(n_{CC}, n_{RNTI})$ that is calculated using the fundamental frequency block-specific index value $n_{CC}$ and the user terminal-specific index value $n_{RNTI}$ is determined by a following equation:

$$f(n_{CC}, n_{RNTI}) = n_{CC} + K n_{RNTI} \text{ or } n_{CC} \cdot n_{RNTI}$$

where K is a constant.

* * * * *